US005978052A

United States Patent [19]

Ilcisin et al.

[11] Patent Number: 5,978,052

[45] Date of Patent: Nov. 2, 1999

[54] METHOD OF OPERATING A PLASMA ADDRESSED LIQUID CRYSTAL DISPLAY PANEL TO EXTEND USEFUL LIFE OF THE PANEL

[75] Inventors: Kevin J. Ilcisin; Thomas S. Buzak, both of Beaverton, Oreg.; Paul C. Martin, Vancouver, Wash.

[73] Assignee: Tektronix, Inc., Wilsonville, Oreg.

[21] Appl. No.: 08/893,655

[22] Filed: Jul. 11, 1997

Related U.S. Application Data

[60] Provisional application No. 60/021,626, Jul. 12, 1996.

[51] Int. Cl.[6] ................................ H04N 3/12; H04N 3/14

[52] U.S. Cl. .......................... 348/797; 348/790; 348/792; 348/751; 345/60; 345/87; 345/100; 345/98

[58] Field of Search .................................... 348/790, 791, 348/792, 793, 751, 761, 766, 143, 152, 153, 154, 155; 345/98, 100, 60, 87, 103

[56] References Cited

U.S. PATENT DOCUMENTS 5,206,630 4/1993 Kim .......................................... 345/60
5,434,589 7/1995 Nakamura et al. ........................ 345/87
5,515,080 5/1996 Nakamura et al. ...................... 345/189
5,583,527 12/1996 Fujisaki et al. ........................... 345/60
5,828,367 10/1998 Kuga ......................................... 345/98

*Primary Examiner*—John K. Peng
*Assistant Examiner*—Paulos Natnael
*Attorney, Agent, or Firm*—John D. Winkelman; John Smith-Hill

[57] ABSTRACT

A display device for displaying an image represented by an incoming raster scan video signal comprises a PALC display panel having a rectangular array of addressable panel elements. A frame buffer stores a frame of video and a comparator compares the incoming video signal with the frame stored in the frame buffer on a line-by-line basis. In the event that a line of the incoming video signal is different from the corresponding line of the stored frame, the line of the incoming video signal is supplied to the display panel and is used to update the corresponding line of the frame buffer. Otherwise, the line of the incoming video signal is not supplied to the display panel.

2 Claims, 2 Drawing Sheets

METHOD OF OPERATING A PLASMA ADDRESSED LIQUID CRYSTAL DISPLAY PANEL TO EXTEND USEFUL LIFE OF THE PANEL

CROSS REFERENCED TO RELATED APPLICATIONS

This application claims the benefit of U.S. Provisional Application No. 60/021,626, filed Jul. 12, 1996.

BACKGROUND OF THE INVENTION

This invention relates to a method of operating a plasma addressed liquid crystal display panel.

Several different types of raster scan liquid crystal (LC) display panels have been developed. One type is known as the active matrix addressed LC display panel and another type is known as the plasma addressed LC display panel. Each type of panel comprises a rectangular array of cells. The various types of LC display panels differ with respect to the manner in which the individual cells are addressed in order to display an image.

FIG. 3 illustrates schematically a single cell 40 of an active matrix addressed raster scan LC display panel. As shown in FIG. 3, this cell comprises upper and lower electrodes 44 and 48 having a layer 52 of twisted nematic (TN) liquid crystal material therebetween. The LC material is almost a perfect insulator, and accordingly the electrical behavior of the cell is similar to that of a capacitor. The upper, or column, electrode 44 is connected to the output terminal of an amplifier 54 which provides a positive voltage that depends upon the desired state of the cell 40. The lower, or row, electrode 48 is connected to ground through a transistor 56. In order to address the cell, the transistor 56 is turned on, forcing the electrode 48 to a potential near ground. The capacitor is charged to a voltage that depends on the output voltage of the amplifier 54 and a field exists in the layer of liquid crystal material. If the voltage between the row and column electrodes is zero, the cell is off, whereas if the voltage is, for example, +3 volts, the cell is on. The voltage may have an intermediate value in order to establish an intermediate state.

The cell 40 is addressed once per frame of an incoming raster scan video signal. Thus, the output voltage of the amplifier 54 is set at a level that depends on the voltage of the video signal during a sampling interval, the transistor 56 is turned on in order to charge the capacitor, and the transistor 56 is then turned off. One frame interval later, the same procedure is repeated.

If the transistor 56 had no off current, the voltage between the row and column electrodes would remain constant until the transistor was turned on again one frame later. However, the transistor 56 has a finite off current, and accordingly the voltage declines during the interval after the transistor turns off. (The liquid crystal material is not a perfect insulator, and accordingly conduction by the LC material contributes to the discharging of the capacitor. Nevertheless, the time constant for the discharge of the capacitor due to conduction by the LC material is much longer than the frame period of the video signal whereas the time constant for discharge due to the off current of the transistor can be shorter than the frame period, and so the off current of the transistor 56 can be the dominant mechanism for discharge of the capacitor.)

The plasma addressed liquid crystal (PALC) display panel shown in FIG. 4 comprises, in sequence from below, a polarizer 2, a channel substrate 4, a cover sheet 6 (commonly known as a microsheet), a dyer 10 of TN liquid crystal material, an array of parallel transparent data drive electrodes (only one of which, designated 12, can be seen in the view shown in FIG. 2), an upper substrate 14 carrying the data drive electrodes, and an upper polarizer 16. The channel substrate 2 is typically made of glass and is formed with multiple parallel channels 20 in its upper main face. The channels 20 are filled with an ionizable gas, such as helium. A cathode 24 and an anode 26 are provided in each of the channels 20. The channels 20 are orthogonal to the data drive electrodes and the region where a data drive electrode crosses a channel (when viewed perpendicularly to the panel) forms a discrete panel element 26. Each panel element can be considered to include elements of the layer 10 and the upper and lower polarizers 2 and 16. In the case of a color display panel, the panel elements include color filters (not shown) between the layer 10 and the upper substrate 14. The region of the upper surface of the display panel that bounds the panel element constitutes a single pixel 28 of the display panel.

As explained in U.S. Pat. No. 5,077,553, when a suitable potential difference is established between the cathode and anode in one of the channels, the gas in that channel forms a plasma that provides a conductive path at the lower surface of the cover sheet 6. If the data drive electrode is at ground potential, there is no significant electric field in the volume element of TN liquid crystal material and the panel element is considered to be off, whereas if the data drive electrode is at a substantially different potential from ground, there is a substantial electric field in that volume element of liquid crystal material and the panel element is considered to be on. An extended light source (not shown) is provided beneath the panel. In the event that a panel element is off the upper polarizer passes light received from the volume element of liquid crystal material and the panel element is illuminated, whereas if a panel element is on, the upper polarizer blocks light received from the volume element of liquid crystal material and the pixel is not illuminated. Black surround material (not shown) is provided between adjacent panel elements in order to absorb stray light and preserve maximum contrast between a panel element that is on and a panel element that is off.

In the case of a plasma addressed liquid crystal display panel, the off current (the rate at which charge is supplied to a panel element via circuitry outside the capacitor) is approximately zero, and consequently, the time constant for decay of the electric field in a panel element is considerably longer than the frame period of the video signal.

The conditions that may exist in a channel of a PALC display panel when a plasma is present may limit the useful life of a PALC display panel. The time for which the plasma exists in a channel depends on the operating conditions of the panel. If the time could be reduced, the useful life of the panel may be extended.

The useful life of a PALC display panel depends at least in part on the amount of time for which a plasma exists in a given channel. Thus, although it is widely accepted that a display panel must have a useful life of about 10,000 hours in order to be commercially acceptable, in the case of a display panel driven by a video signal at a frame rate of 60 Hz and having 480 active lines per frame, over 10,000 hours of operation a plasma exists in a given channel only for about approximately 3–4 hours.

SUMMARY OF THE INVENTION

In accordance with a first aspect of the invention, there is provided a plasma addressed liquid crystal display device for displaying an image represented by an incoming video signal having a succession of frames, wherein each frame is composed of a succession of lines and each line is composed of a succession of pixel values, said display device comprising a PALC display panel having a rectangular array of addressable panel elements organized as a plurality of rows each comprising a plurality of panel elements, a memory means for storing at least one video frame, a comparison means for comparing the incoming video signal with the stored video frame on a line-by-line basis, and a controller responsive to the comparison means for supplying a line of the incoming video signal to the display panel and updating the corresponding line of the memory means in the event that the line of the incoming video signal is different from the stored line, and otherwise not supplying the line of the incoming video signal to the display panel.

In accordance with a second aspect of the invention, there is provided a method of operating a plasma addressed liquid crystal display panel having a rectangular array of addressable panel elements organized as a plurality of rows each comprising a plurality of panel elements, said method comprising (a) receiving a line of a video signal having a succession of frames, wherein each frame is composed of a succession of lines, (b) comparing the line received in step (a) with a corresponding line of a stored frame, and (c) if the line received in step (a) is different from the corresponding line of the stored frame, supplying the received line to the display panel and updating the corresponding line of the stored frame, and otherwise not supplying the received line to the display panel.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
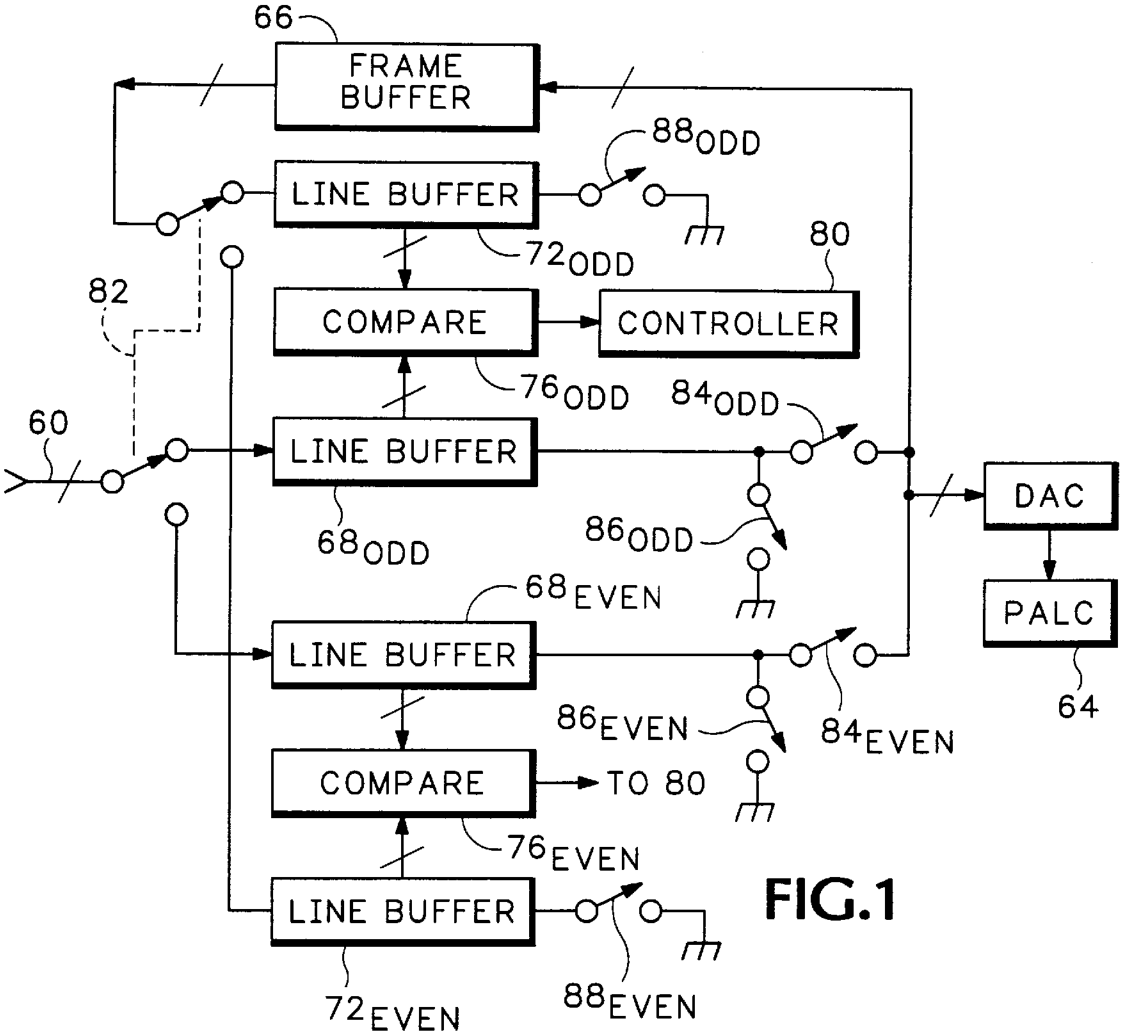
FIG. 1 is a block schematic diagram of a PALC display device in accordance with the present invention.

FIG. 1 illustrates a plasma addressed liquid crystal display device for displaying an image represented by an incoming digital video signal that is applied to the terminal 60. By way of example, the video signal is composed of a succession of active frame intervals that occur at a rate of 60 Hz, and each active frame interval is composed of 480 line intervals, each having 1920 digital pixel values. Each pixel value is quantized to 4–12 bits. The digital video signal may be generated from a composite NTSC signal by digitizing and deinterlacing the composite video signal and substituting digital framing data for the vertical and horizontal retrace intervals.

The display device includes a PALC display panel 64 having a rectangular array of panel elements organized in rows and columns. There is one row of panel elements for each line interval of the video frame, and one column of panel elements for each pixel value in the video line.

The display device further comprises a frame buffer 66 organized as a rectangular array of storage elements. The storage elements of the frame buffer map on a one-to-one basis with the panel elements of the display panel. Each storage element is able to store a 4–12 bit digital word. The frame buffer stores one frame of a video signal. A controller 80 reads the video signal from the frame buffer 66 synchronously with the video signal received at the terminal 60.

During line 1 of a frame of the video signal, a switch 82 controlled by the controller 80 loads the digital video signal into a line buffer $\mathbf{68}_{odd}$ and loads the video signal read from the frame buffer into a line buffer $\mathbf{72}_{odd}$. During line 2 of the frame of the video signal, in which the incoming video signal is loaded into a line buffer $\mathbf{68}_{even}$ and the video signal read from the frame buffer is loaded into a line buffer $\mathbf{72}_{even}$, the contents of the line buffers $\mathbf{68}_{odd}$ and $\mathbf{72}_{odd}$ are compared on a pixel-for-pixel basis by a comparator $\mathbf{76}_{odd}$. The output of the comparator $\mathbf{76}_{odd}$ is supplied to the controller 80. If the output of the comparator $\mathbf{76}_{odd}$ indicates that the contents of the two line buffers are different, a switch $\mathbf{84}_{odd}$ controlled by the controller 80 steers the contents of the line buffer $\mathbf{68}_{odd}$ to the PALC display panel and the frame buffer for updating line 1 of the display and line 1 of the stored frame, but if the contents of the two line buffers are identical, a switch $\mathbf{86}_{odd}$ controlled by the controller 80 flushes the data values stored in the line buffer $\mathbf{68}_{odd}$ to ground without addressing either the PALC display panel or the frame buffer. In either case, the contents of the line buffer $\mathbf{72}_{odd}$ are flushed to ground via a switch $\mathbf{88}_{odd}$.

During line 3 of the frame of the video signal, the contents of the line buffer $\mathbf{68}_{even}$ are compared with the contents of the line buffer $\mathbf{72}_{even}$ on a pixel-for-pixel basis by a comparator $\mathbf{76}_{even}$ while the incoming video signal is loaded into the line buffer $\mathbf{68}_{odd}$ and line 3 of video signal read from the frame buffer is loaded into the line buffer $\mathbf{72}_{odd}$. If the contents of the two line buffers are different, the controller 80 causes the contents of the line buffer $\mathbf{68}_{even}$ to be used to update line 1 of both the PALC display panel and the frame buffer via a switch $\mathbf{84}_{even}$, but if the contents of the two line buffers are identical, the controller 80 causes the data values stored in the line buffer $\mathbf{68}_{even}$ to be flushed to ground via a switch $\mathbf{86}_{even}$ without addressing either the PALC display panel or the frame buffer. The contents of the line buffer $\mathbf{72}_{even}$ are flushed to ground via a switch $\mathbf{88}_{even}$.

This process is repeated throughout the frame, and it will therefore be seen that a row of panel elements of the PALC display panel is addressed only when the pixel values on a line of the video signal are different from the pixel values on the corresponding line of the previous frame. By addressing a row of the PALC display panel only when the video signal for that row of the display is different from the corresponding row of the previous frame, power consumption is reduced and the useful life of the display panel is increased because the number of times that a plasma is formed in a given channel is reduced.

Figure 2:
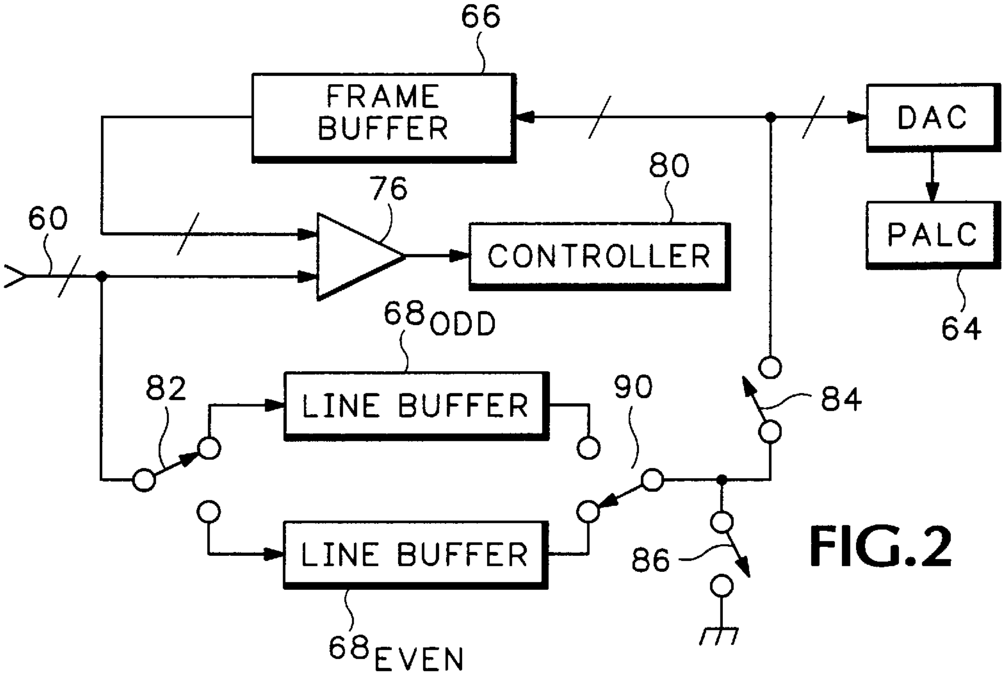
FIG. 2 is a block schematic diagram of a second PALC display device in accordance with the present invention.
Figure 3:
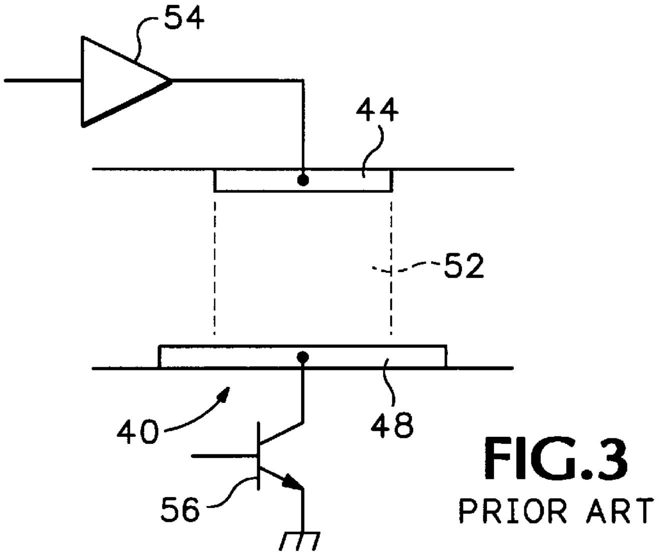
FIG.3 PRIOR ART
FIG. 3 illustrates schematically one cell of an active matrix addressed LC display panel.
Figure 4:
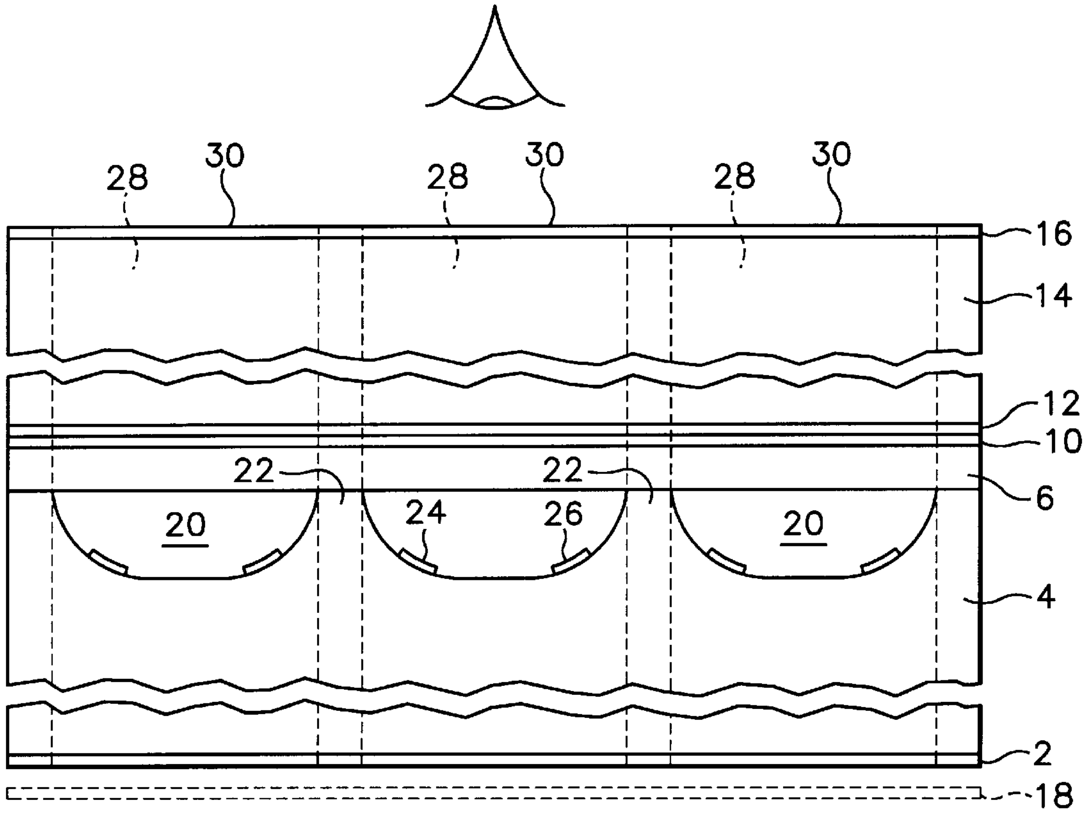
FIG.4 PRIOR ART
FIG. 4 illustrates schematically a sectional view of a PALC display panel in accordance with the prior art.

Alternatively, instead of employing the line buffers 72, a given line of a frame of the incoming video signal may be compared on a pixel-by-pixel basis with the corresponding line of the frame stored in the frame buffer 66 as the line is read from the frame buffer. Thus, referring to FIG. 2, as line 1 of a frame of the incoming video signal is received at the terminal 60 and is loaded into the line buffer $\mathbf{68}_{odd}$, line 1 of the frame stored in the frame buffer is read synchronously with the incoming video signal and the two sequences of pixel values are compared on a pixel-by-pixel basis by the comparator 76. The controller 80 records whether the two sequences of pixels matched. During line 2 of the frame of the incoming video signal, the incoming video signal is written into the line buffer $\mathbf{68}_{even}$ and is simultaneously compared, on a pixel-by-pixel basis, with line 2 of the frame stored in the frame buffer. Concurrently, the contents of the line buffer 68$_{odd}$ are read by way of a switch 90 and, depending on whether line 1 of the incoming video signal matched line 1 of the frame read from the frame buffer, the pixel values are either flushed to ground via the switch 86 or used to address the display panel 64 and update the contents of the frame buffer 68 via the switch 84.

In order to avoid conflict between reading from and writing to the frame buffer, it may be necessary to organize the frame buffer as two field buffers, one for the odd numbered lines and the other for the even numbered lines.

The controller 80 may include a counter that stores a count value for each line of the frame. If the controller determines that the line of the incoming video signal matched the line of the frame stored in the frame buffer, the count stored for that line is incremented, whereas if the incoming video signal did not match the line of the frame stored in the frame buffer, the count is reset to zero. When the count accumulated for a given line reaches a predetermined value, the controller 80 resets the count to zero and causes the corresponding line on the next frame of the incoming video signal to update the display panel and the frame buffer, regardless of the result provided by the comparator. This ensures that the display is not degraded to an unacceptable extent due to either the off current or the conductivity of the LC material being non-zero.

It will be appreciated that the invention is not restricted to the particular embodiments that have been described, and that variations may be made therein without departing from the scope of the invention as defined in the appended claims and equivalents thereof for example, although in the case of the device illustrated in FIG. 1, any difference between a line of the incoming video signal and the corresponding line stored in the frame buffer will trigger an update of both the display panel and the frame buffer, the controller may override the update decision in the event that the difference is so small as to be imperceptible.

We claim:

1. A plasma addressed liquid crystal display device for displaying an image represented by an incoming video signal having a succession of frames, wherein each frame is composed of a succession of lines and each line is composed of a succession of pixel values, said display device comprising:

a PALC display panel having a rectangular array of addressable panel elements organized as a plurality of rows each comprising a plurality of panel elements, a memory means for storing at least one video frame, a comparison means for comparing the incoming video signal with the stored video frame on a line-by-line basis, and a controller responsive to the comparison means for supplying a line of the incoming video signal to the display panel and updating the corresponding line of the memory means in the event that the line of the incoming video signal is different from the stored line, and otherwise not supplying the line of the incoming video signal to the display panel.

2. A method of operating a plasma addressed liquid crystal display panel having a rectangular array of addressable panel elements organized as a plurality of rows each comprising a plurality of panel elements, said method comprising:

(a) receiving a line of a video signal having a succession of frames, wherein each frame is composed of a succession of lines, (b) comparing the line received in step (a) with a corresponding line of a stored frame, and (c) if the line received in step (a) is different from the corresponding line of the stored frame, supplying the received line to the display panel and updating the corresponding line of the stored frame, and otherwise not supplying the received line to the display panel.

* * * * *